(12) United States Patent
Spyra et al.

(10) Patent No.: US 12,241,401 B2
(45) Date of Patent: Mar. 4, 2025

(54) INTERNAL COMBUSTION ENGINE AND A METHOD FOR OPERATING AN INTERNAL COMBUSTION ENGINE

(71) Applicant: INNIO Jenbacher GmbH & Co OG, Jenbach (AT)

(72) Inventors: Nikolaus Spyra, Innsbruck (AT); Herbert Schaumberger, Muenster (AT); Jochen Fuchs, Wattens (AT); Wolfgang Fimml, Maurach in Tirol (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 150 days.

(21) Appl. No.: 17/920,914

(22) PCT Filed: May 6, 2020

(86) PCT No.: PCT/AT2020/060182
§ 371 (c)(1),
(2) Date: Oct. 24, 2022

(87) PCT Pub. No.: WO2021/232076
PCT Pub. Date: Nov. 25, 2021

(65) Prior Publication Data
US 2023/0167762 A1 Jun. 1, 2023

(51) Int. Cl.
*F02B 19/10* (2006.01)
*F02B 19/12* (2006.01)
(Continued)

(52) U.S. Cl.
CPC ...... *F02B 19/1038* (2013.01); *F02B 19/1052* (2013.01); *F02B 19/1057* (2013.01);
(Continued)

(58) Field of Classification Search
CPC .............. F02B 19/1038; F02B 19/1052; F02B 19/1057; F02B 19/12; F02B 19/18;
(Continued)

(56) References Cited

U.S. PATENT DOCUMENTS 9,482,192 B2 11/2016 Kim
2003/0020093 A1 10/2003 Hiltner et al.
(Continued)

FOREIGN PATENT DOCUMENTS

DE  10 2015 016 772 A1  7/2016
EP       1359298 A2      11/2003
(Continued)

OTHER PUBLICATIONS

PCT International Search Report and Written Opinion; Application No. PCT/AT2020/060182; dated Nov. 17, 2020; 14 pages.
(Continued)

*Primary Examiner* — Xiao En Mo
(74) *Attorney, Agent, or Firm* — Fletcher Yoder, P.C.

(57) ABSTRACT

An internal combustion engine comprising: a main combustion chamber comprising at least one intake valve and at least one exhaust valve, wherein at least one intake port fluidically connected to an intake manifold is configured to supply an air and/or an air-fuel-mixture to the main combustion chamber via the at least one intake valve, and a pre-chamber which is in fluid connection with the main combustion chamber, wherein the pre-chamber is in fluid connection with the intake port and/or the intake manifold through a supply line, wherein at least one fuel injector is configured to enrich the air and/or air-fuel-mixture supplied to the main combustion chamber to have a lower ignition delay than an air-fuel-mixture supplied to the pre-chamber and/or air or air-fuel-mixture can be supplied to the pre- (Continued)

chamber to have a higher ignition delay than an air-fuel-mixture supplied to the main combustion chamber.

20 Claims, 8 Drawing Sheets

(51) Int. Cl.
*F02B 19/18* (2006.01)
*F02D 19/02* (2006.01)
*F02D 19/06* (2006.01)
*F02B 43/10* (2006.01)

(52) U.S. Cl.
CPC .............. *F02B 19/12* (2013.01); *F02B 19/18* (2013.01); *F02D 19/024* (2013.01); *F02D 19/0644* (2013.01); *F02B 2043/106* (2013.01)

(58) Field of Classification Search
CPC ............ F02B 2043/106; F02B 19/1028; F02B 19/1047; F02B 43/12; F02B 19/1061; F02D 19/024; F02D 19/0644; F02D 41/0025; F02D 41/0027; F02D 19/081; F02D 19/10; F02M 21/0206; F02M 21/0209; F02M 21/0275; F02M 21/06
See application file for complete search history.

(56) References Cited

U.S. PATENT DOCUMENTS

2003/0200939 A1* 10/2003 Hiltner .................... F02B 43/10
123/3
2013/0055985 A1 3/2013 Friedrich et al.
2019/0078498 A1* 3/2019 Bedogni ............. F02B 19/1019

FOREIGN PATENT DOCUMENTS

EP 2558696 B1 4/2015
WO 2011015329 A1 2/2011

OTHER PUBLICATIONS

Zhen Xudong et al.; "Comparative study on combustion and emission characteristics of methanol/hydrogen, ethano/hydrogen and methane/hydrogen blends in high compression ratio SI engine", Fuel, IPC Science and Technology Press, Guildford, GB, vol. 267, Jan. 31, 2020 (Jan. 31, 2020), XP086053037, ISSN: 0016-2361, DOI: 10.1016/J.FUEL.2020.117193 [retrieved on Jan. 31, 2020] figures 5,6, 9 pgs.

* cited by examiner

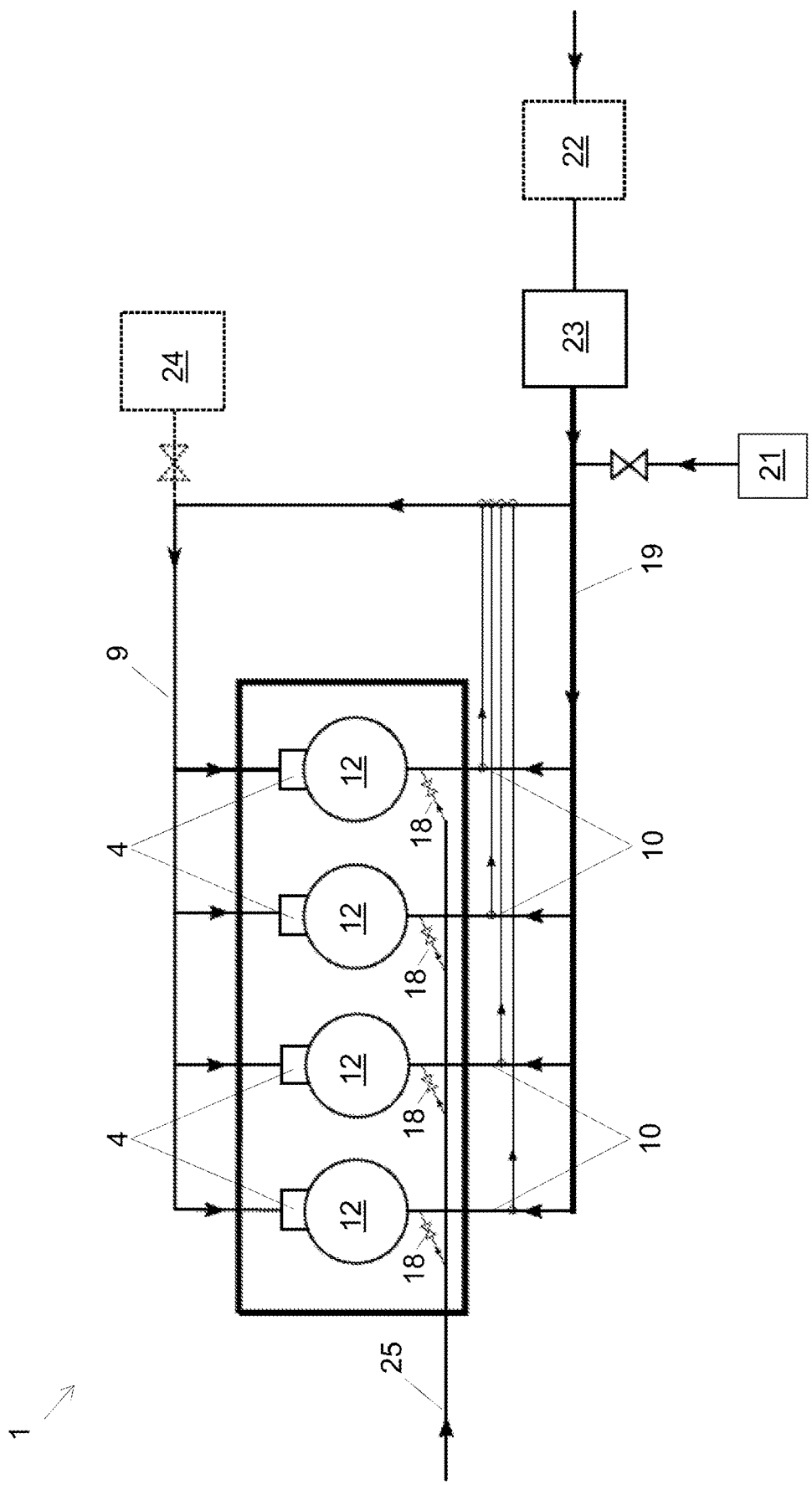

INTERNAL COMBUSTION ENGINE AND A METHOD FOR OPERATING AN INTERNAL COMBUSTION ENGINE

CROSS-REFERENCE TO RELATED APPLICATION

This application is a National Stage entry from, and claims benefit of, PCT Application No. PCT/AT2020/060182, filed on May 6, 2020; entitled "INTERNAL COMBUSTION ENGINE AND A METHOD FOR OPERATING AN INTERNAL COMBUSTION ENGINE", which is herein incorporated by reference in its entirety.

BACKGROUND

The present invention concerns an internal combustion engine and a method for operating an internal combustion engine.

Starting from a certain size of gas engines (generally with cylinder capacity above about six liters), it is necessary to use ignition amplifiers, in order to properly ignite the lean air-fuel-mixture in the large volume of the cylinders.

Pre-chambers usually serve as these ignition intensifiers, wherein the fuel-air mixture that is highly compressed at the end of the compression stroke is ignited in a relatively small secondary space separate from the main combustion chamber of the cylinders. In this case, a main combustion chamber is delimited by the working piston, the cylinder liner, and (a flame plate of) the cylinder head, wherein the secondary space (the pre-chamber) is connected via one or a plurality of transfer passages with the main combustion chamber.

Often these pre-chambers are scavenged or filled with fuel gas during the gas exchange phase, in order to enrich the fuel-air mixture in the pre-chamber and thus improve the ignition and combustion properties. For this, a small amount of fuel gas is branched off from the fuel supply line to the main combustion chamber and fed into the pre-chamber via a suitable feed device provided with a non-return valve. This amount of fuel gas flushes the pre-chamber during gas exchange and so is known as flushing or scavenging gas.

During the compression phase, the very lean fuel-air mixture of the main combustion chamber flows through the transfer passages into the pre-chamber, where it mixes with the scavenging gas. The ratio of fuel to air in the mixture is stated as the excess-air ratio (lambda, $\lambda$). An excess-air ratio (lambda) of $\lambda=1$ means that the amount of air present in the mixture corresponds exactly to the amount that is required to allow complete combustion of that amount of fuel. In such a case, combustion takes place stoichiometrically.

At full load, large gas engines are usually run lean, at $\lambda$ of approx. 1.7 to 2.0, i.e., the amount of air in the mixture corresponds to about twice the stoichiometric amount of air. Owing to the flushing of the pre-chamber with fuel gas, after mixing with the fuel gas-air mixture of the main combustion chamber, an average $\lambda$ in the pre-chamber is approximately 0.8 to 0.9. Therefore, the ignition conditions are optimal and flame jets extend through the transfer passages into the main combustion chamber, which lead to a rapid, thorough combustion of the fuel-air mixture in the main combustion chamber.

At these $\lambda$ values, however, combustion takes place at the maximum temperature level, so that the wall temperatures in the region of the pre-chamber are also correspondingly high. As a result, on the one hand there is correspondingly high thermal loading of the pre-chamber and of the components arranged therein (e.g. spark plug), and on the other hand there are undesirably high nitrogen oxide emissions.

Furthermore, as the market offer of hydrogen increases continuously and the price of hydrogen decreases, it is desirably to generate a method to use hydrogen as fuel—at least as additional fuel—for the above described internal combustion engines.

Such a use of hydrogen as additive fuel for internal combustion engines having a pre-chamber is, for example, known from DE 10 2015 016 772 A1, EP 2 558 696 B1 and US 2003/0200939 A1, wherein hydrogen enriched fuel is supplied to the pre-chamber to change the combustion properties of the fuel supplied to the pre-chamber.

The disadvantage of such configurations is, that the already thermally loaded pre-chamber and the correspondingly high thermal loaded components arranged therein receive an additional thermal load, because the combustion of hydrogen or hydrogen enriched air-fuel-mixture generates higher temperatures than without hydrogen.

Moreover, since hydrogen—compared to, e.g., natural gas—exhibits a significantly higher tendency for un-controlled combustion, a further disadvantage arises from the fact that the mentioned components, which are heated up because of the combustion of hydrogen or hydrogen enriched air-fuel-mixture, have extremely hot surfaces (especially in the pre-chamber). These hot surfaces in combination with the enriched and highly combustible fuel results in early—unintended—ignitions (ignitions caused by the hot surfaces).

BRIEF DESCRIPTION

The disclosed embodiments provide an internal combustion engine and a method for operating an internal combustion engine, wherein the disclosed embodiments are configured to achieve a reduction in the thermal load on the pre-chamber and/or a reduction in the risk of early—unintended—ignitions although hydrogen is used as fuel.

The disclosed embodiments of the internal combustion engine and the method for operating an internal combustion engine may be configured to achieve the foregoing reductions as described in further detail below and as set forth in the claims.

According to embodiments of the invention, it is provided that the internal combustion engine comprises a pre-chamber which is in fluid connection with the main combustion chamber, wherein the pre-chamber is in fluid connection with the intake port and/or the intake manifold through a supply line, wherein at least one fuel injector is arranged in the intake port, the intake manifold and/or the main combustion chamber in such a way that the air and/or air-fuel-mixture supplied to the main combustion chamber can be enriched to have a lower ignition delay than an air-fuel-mixture supplied to the pre-chamber and/or air or air-fuel-mixture can be supplied to the pre-chamber to have a higher ignition delay than an air-fuel-mixture supplied to the main combustion chamber.

According to embodiments of the method for operating an internal combustion engine, the internal combustion engine comprises a pre-chamber and main combustion chamber, wherein an air-fuel-mixture is supplied to the pre-chamber, wherein an air-fuel-mixture ignited in the main combustion chamber has a lower ignition delay than the air-fuel-mixture supplied to the pre-chamber.

The basic idea of the disclosed embodiments is therefore that the air-fuel-mixture combusted in the main combustion chamber has a higher ignitability (and therefore a lower ignition delay) than the air-fuel-mixture combusted in the pre-chamber. Examples for achieving this would be the use of (at least partly) different fuels for the pre-chamber and the main combustion chamber or an air fuel ratio (lambda) closer to $\lambda=1$ in the main combustion chamber compared to the pre-chamber.

Therefore, the following terminologies have to be distinguished:
- the air-fuel-mixture supplied to the pre-chamber
- the air-fuel-mixture supplied to the main combustion chamber
- the air-fuel-mixture ignited in the main combustion chamber The differences are explained in the following.

Initially, the air-fuel-mixture combusted in the main combustion chamber is obviously the air-fuel-mixture ignited (via the effect of the pre-chamber) in the main combustion chamber.

The air-fuel-mixture supplied to the main combustion chamber does not have to be the same air-fuel-mixture that is ignited in the main combustion chamber, as in some preferred embodiments the at least one fuel injector according to aspects of the invention can be arranged in the main combustion chamber. In these embodiments, the air-fuel-mixture ignited in the main combustion chamber manifests itself only after the at least one fuel injector injects the (preferably additional) fuel into the main combustion chamber. As also pointed out later, in such embodiments, it is furthermore possible according to aspects of the invention to arrange at least one further fuel injector in the main combustion chamber for providing a different fuel compared to the fuel supplied by the at least one fuel injector. In this case only, air may be supplied to the main combustion chamber, while the air-fuel-mixture combusted in the main combustion chamber will as mentioned only come into existence in the main combustion chamber.

Of course, there are other embodiments where the at least one fuel injector is arranged in the intake port and/or the intake manifold. In these cases, the fuel injected by the at least one fuel injector is at least partly mixed with the air or air-fuel-mixture already in the intake port and/or the intake manifold.

Similarly, there are several options for supplying the respective air-fuel-mixture to the pre-chamber. The air-fuel-mixture supplied to the pre-chamber can be supplied in already mixed form, or air and the fuel for the air-fuel-mixture to be supplied to the pre-chamber can be supplied separately, i.e., air is supplied directly and fuel (usually with some additional air) is supplied via the main combustion chamber during the compression stroke.

It should be mentioned, that the air-fuel-mixture present in the main combustion chamber is partly pressed into the pre-chamber during the compression stroke of the internal combustion engine. The fuel for the air-fuel-mixture supplied to the pre-chamber can also reach the pre-chamber in this way. In these embodiments, the air-fuel-mixture supplied to the pre-chamber only manifests itself during the compression stroke.

Consequently, the following describe some basic exemplary embodiments of the invention:
- an air fuel mixture is supplied to the main combustion chamber, an air-fuel-mixture is supplied to the pre-chamber, the at least one fuel injector is arranged in the main combustion chamber, a gas mixer or at least one further fuel injector is arranged in the intake port,
- an air fuel mixture is supplied to the main combustion chamber, an air-fuel-mixture is supplied to the pre-chamber, the at least one fuel injector is arranged in the main combustion chamber, a gas mixer or at least one further fuel injector is arranged in the intake manifold,
- an air fuel mixture is supplied to the main combustion chamber, an air-fuel-mixture is supplied to the pre-chamber, the at least one fuel injector is arranged in the main combustion chamber, at least one further fuel injector is arranged in the main combustion chamber,
- an air fuel mixture is supplied to the main combustion chamber, an air-fuel-mixture is supplied to the pre-chamber, the at least one fuel injector is arranged in the intake port, a gas mixer or at least one further fuel injector is arranged in the intake port,
- an air fuel mixture is supplied to the main combustion chamber, an air-fuel-mixture is supplied to the pre-chamber, the at least one fuel injector is arranged in the intake manifold, a gas mixer or at least one further fuel injector is arranged in the intake manifold,
- an air fuel mixture is supplied to the main combustion chamber, an air-fuel-mixture is supplied to the pre-chamber, the at least one fuel injector is arranged in the intake port, at least one further fuel injector is arranged in the main combustion chamber,
- an air fuel mixture is supplied to the main combustion chamber, an air-fuel-mixture is supplied to the pre-chamber, the at least one fuel injector is arranged in the intake manifold, at least one further fuel injector is arranged in the main combustion chamber,
- air is supplied to the main combustion chamber, air is supplied to the pre-chamber, the at least one fuel injector is arranged in the main combustion chamber, at least one further fuel injector is arranged in the main combustion chamber, and/or
- air is supplied to the main combustion chamber, air is supplied to the pre-chamber, the at least one fuel injector is arranged in the main combustion chamber, a first further fuel injector is arranged in the main combustion chamber, a second further fuel injector is arranged in the pre-chamber.

Of course, in all embodiments according to the invention, the ignition delay of the air-fuel-mixture ignited in the main combustion is lower than the air-fuel-mixture supplied to the pre-chamber. This is for example achieved through specific arrangements of the gas mixer and/or at least one fuel injector and/or at least one further fuel injector in relation to each other or through valves with specifically timed opening and closing operations as specified below.

According to the aforesaid, the at least one fuel injector can be arranged such that the enrichment takes place during and/or after a mixing of air and fuel to obtain the enriched or as yet un-enriched air-fuel-mixture.

Alternatively or additionally, the fuel supplied by the at least one fuel injector can be mixed with air, and the fuel for the air-fuel-mixture supplied to the main combustion chamber can be added thereafter The lower ignition delay of the air-fuel-mixture ignited in the main combustion chamber compared to the air-fuel-mixture supplied to the pre-chamber, as defined in the method according to embodiments of the invention, can be achieved by enriching the air and/or air-fuel-mixture supplied to the main combustion chamber making use of at least one fuel injector.

In other embodiments of the method according to the invention, the lower ignition delay of the air-fuel-mixture ignited in the main combustion chamber compared to the air-fuel-mixture supplied to the pre-chamber can be achieved by supplying an air-fuel-mixture to the main combustion chamber with an air fuel ratio (lambda) closer to $\lambda=1$ compared to the air-fuel-mixture supplied to the pre-chamber.

To achieve a higher ignition delay of the air-fuel mixture in the pre-chamber compared to the air-fuel mixture supplied to the main combustion chamber, air and or a fuel-air mixture having a higher ignition delay can be supplied to the pre-chamber and/or an air-fuel mixture with lower ignition delay can be supplied to the main combustion chamber.

In other words, to achieve a lower ignitibility of the air-fuel mixture in the pre-chamber compared to the air-fuel mixture supplied to the main combustion chamber, air or a different fuel-air mixture having a lower ignitibility can be supplied to the pre-chamber and/or an air-fuel mixture with higher ignitibility can be supplied to the main combustion chamber.

It can be provided that not only air but an air fuel mixture is supplied to the pre-chamber, wherein the same fuel for an air fuel mixture but with different air fuel ratio (lambda) is supplied to the pre-chamber compared to the air fuel mixture supplied to the main combustion chamber, such that the air fuel mixture supplied into the pre-chamber having a higher ignition delay compared to the ignition delay of the air fuel mixture supplied into the main combustion chamber.

It can also be provided to combine the mentioned embodiments to achieve a higher ignition delay of an air and/or air fuel mixture introduced into the pre-chamber compared to the air fuel mixture introduced into the main combustion chamber, e.g., it can be provided to add at least one second fuel or air fuel mixture to the air and/or the air fuel mixture supplied to the main combustion chamber via a fuel injector, the fuel injector being preferably provided in the area of the intake port and preferably placed downstream from the branch of the supply line of the pre-chamber, combined with supplying an air and/or air fuel mixture with an air fuel ratio (lambda) closer to $\lambda=1$—compared to the air fuel mixture supplied to the main combustion chamber—into the pre-chamber.

It has to be mentioned, that in the context of embodiments of the invention, a higher ignition delay is identified with a lower ignitibility and vice versa. It also has to be mentioned, that all statements regarding air fuel mixtures with "higher" or "lower" ignition delay are compared to each other assuming that the ignition delay is determined under same ambient conditions (e.g., temperature, pressure, etc.), although the conditions are different in the pre-chamber and the main combustion chamber during the operation of the combustion engine.

In the case of the use of a single fuel—as already mentioned above—the ignition delay can be varied by varying the lambda value of the air fuel mixture according to embodiments of the invention. This delay period consists of a physical delay, wherein atomization, vaporization and mixing of air fuel occur and of a chemical delay attributed to pre-combustion reactions. Physical and chemical delays occur simultaneously. Methods for calculating the physical and the chemical delay period can be found in the literature.

The ignition delay can, e.g., be rated by the by the methane number which describes the knocking tendency of a fuel at a scale from hydrogen (having a high knocking tendency and a methane number of 0) to methane (having a low knocking tendency and a methane number of 100). Therefore, the methane number may also be used as a measure for the ignition delay, wherein lower ignition delay is given if the methane number is low and vice versa. Also, octane instead of methane can be used for determining the octane number.

It is known by the state of the art to measure the ignition delay by standardized processes, wherein the ignition delay can be determined for, e.g., different fuels, air-fuel-ratios, fuel-mixtures, temperatures or pressures. The ignition delay can be given by sheets of producers, providers, data sheets, or so on.

The ignition delay can additionally or alternatively be measured by the flame speed or the ignitability, wherein the flame speed or the ignitability increases with decreasing ignition delay. The flame speed is also a known value in the state of the art and is given by data sheets (e.g., generated by results of experiments), wherein the data sheets also include diagrams for fuels giving the flame speed in dependency of the excess air ratio (lambda).

Ignitability can be understood as the property of how readily an air-fuel-mixture ignites, in particular self-ignites (uncontrolled combustion). The ignitability of an air-fuel-mixture is, of course, influenced by the fuel used in the air-fuel-mixture. For example, (molecular) hydrogen has a very high tendency for uncontrolled ignition (low methane number), while, e.g., methane has a relatively low tendency for uncontrolled ignition (high methane number).

Other factors which may influence the ignition delay of an air-fuel-mixture are, for example, the volatility of the fuel (i.e., how quickly the fuel evaporates) and, of course, the air fuel ratio (lambda), since air-fuel-mixtures with lambda close to $\lambda=1$ ignite more readily than air-fuel-mixtures with higher lambda.

For the purposes of embodiments of the invention, the expression that some components (e.g., fuel injectors, valves and the like) are arranged "in" another element of the system (e.g., the main combustion chamber, the intake port, the intake manifold, the supply line and the like) is not necessarily to be understood to mean arranged "inside" the element. Rather, it means that the component is arranged in or at the element, such that it can be effective according to its purpose. For example, a fuel injector "in" the main combustion chamber, has to be arranged in such a way at or near the main combustion chamber, that the fuel can effectively be injected into the main combustion chamber.

The flushing of the pre-chamber with an air-fuel-mixture or only air having a higher ignition delay generates a cooling effect for the pre-chamber and all components arranged in the pre-chamber, wherein the risk of ignition on a hot surface is reduced. In a following compression stroke, an air-fuel-mixture is pressed from the main combustion chamber into the pre-chamber, so that the air, fuel and/or air-fuel-mixture supplied to the pre-chamber is mixed with the air-fuel-mixture coming from the main combustion chamber. Therefore, a leaner mixture may be generated in the pre-chamber in comparison to the main combustion chamber, resulting in lower combustion temperatures in the pre-chamber and a lower tendency for early ignition.

A further advantage of embodiments of the present invention is that internal combustion engines can be provided which can be operated with only a first fuel and only a second fuel—preferably hydrogen—and a combination thereof at any mixture ratio between the first fuel and the second fuel in different modes of operation. The first fuel could, for example, be a burnable gas, such as natural gas or other gases containing methane and/or other hydrocarbons.

Already present internal combustion engines can be upgraded with at least one fuel injector arranged in the intake port, the intake manifold or the main combustion chamber according to embodiments of the invention.

The supply line can also be viewed as a general conduit creating fluid communication between the intake port or the intake manifold on the one hand and the pre-chamber (although valves can of course be present) on the other hand.

The main combustion chamber can be the cylinder of a reciprocating piston engine.

Such a reciprocating piston engine can, of course, have several cylinders and embodiments of the invention can be realized for one of the cylinders, a sub-set of the cylinders or all of cylinders, in particular some cylinder banks or all cylinder banks, if more cylinder banks are present.

The cylinder may be delimited by parts of an internal combustion engine, such as a cylinder liner and/or a crank case and/or a cylinder head and/or a piston. For the purpose of embodiments of the present invention, such components are collectively referred to as cylinder.

The intake port can be understood as a conduit or manifold, which is in fluid communication with the main combustion chamber, providing the main combustion chamber with a fuel, an air, or an air-fuel-mixture.

The intake manifold can be understood as a conduit or manifold, which is in fluid communication with the intake port, providing the intake port with a fuel, an air, or an air-fuel-mixture. The intake manifold can, e.g., be provided for more than intake port.

For the purposes of embodiments of the invention, the intake port and/or the intake manifold can, for example, comprise pipes, tubing and/or other (specifically shaped) parts for creating a volume of the air and/or air fuel mixture supplied to the main combustion chamber. In particular, the intake port and/or the intake manifold can comprise one or more parts.

Furthermore, embodiments are conceivable, wherein other components are arranged in the intake port and/or intake manifold (e.g., injectors, sensors, valves, and so on).

The disclosed embodiments of the invention are favorable for use with pure hydrogen combustion engines, wherein an air is supplied to the main combustion chamber, the pre-chamber is scavenged by air and the air supplied to the main combustion chamber is enriched by hydrogen, preferably by a hydrogen injector arranged in the intake port and/or the intake manifold shortly before entrance to the main combustion chamber.

The disclosed embodiments of the invention can be used for the embodiments of the prior art already in the introduction of the description described.

Advantageous embodiments are defined in the claims.

It can be provided that the at least one fuel injector is arranged in flow direction downstream of a branch of the supply line of the pre-chamber and the intake port and/or the intake manifold.

At least one throttle valve can be provided in the supply line of the pre-chamber.

Preferably, it can be provided that the at least one fuel injector is arranged in flow direction upstream of a branch of the supply line of the pre-chamber and the intake port and/or the intake manifold and a control device for controlling the throttle valve is provided, which control device is configured to close the throttle valve when a volume of air or air fuel mixture enriched by the at least one fuel injector passes the branch of the supply line of the pre-chamber and the intake port and/or the intake manifold. The control device can for example be provided for open or closed loop control.

It can be provided that the at least one fuel injector is configured as a hydrogen injector.

In other words, the fuel for enrichment can be (molecular) hydrogen.

However, it is also quite conceivable to use other—preferably highly—ignitable gases (e.g., acetylene, ethylene, propane, and so on) having a low ignition delay.

It can be provided that the at least one fuel injector is designed as a port injection valve.

It can be provided that the at least one fuel injector is arranged between the supply line and the intake valve. However, it is also quite conceivable to arrange the fuel injector directly in the main combustion chamber or in flow direction upstream of the branch of the supply line and the intake port.

It can be provided that the supply line of the pre-chamber is formed as a cavity in a cylinder head. By designing the supply line directly in the cylinder head, the line can be provided during the manufacture of the cylinder head, e.g., as at least one bore). Alternatively, the supply line can be designed as a branch line, which is structurally separated from the cylinder head.

A tempering device for the supply line can be provided. By providing a tempering device, the air, fuel, or air-fuel mixture provided for the pre-chamber can be cooled or heated additionally before it is supplied to the pre-chamber. The efficiency of cooling the pre-chamber and the combustion efficiency can be increased by an additional cooling of the air, fuel, or air-fuel mixture provided for the pre-chamber. If the supply line is designed as a cavity in the cylinder head, engine coolant, such as water, can be used in a simple manner for pre-heating the air, fuel, or air-fuel mixture in the supply line.

At least one pre-chamber gas valve can be provided for controlling a flow of the air and/or the air-fuel-mixture from the supply line to the pre-chamber or for preventing a back flow from the pre-chamber into the supply line. Such a pre-chamber gas valve can, for example, be released as individually controlled valves, cam activated valves, check valves, and so on.

At least one compressor can be provided in flow direction upstream of the at least one intake port and/or the intake manifold.

It can be provided that the at least one compressor is designed as part of a turbo charger, wherein the at least one compressor is connected via a shaft or electrically with at least one exhaust turbine. It can be provided that the at least one compressor is configured to charge an air or an air-fuel-mixture, which is supplied to the intake port and/or the intake manifold.

At least one mixing device can be provided which mixing device is configured to provide the air-fuel-mixture for the main combustion chamber, wherein a first fuel of the air-fuel-mixture and a second fuel supplied by the at least one fuel injector are different. Preferably, it can be provided that the at least one mixing device is designed as gas mixer, preferably for mixing air and natural gas.

At least one further fuel injector can be provided, wherein a first fuel supplied by the at least one further injector and a second fuel supplied by the at least one injector are different. It is also quite conceivable to use at least one multi fuel injector, wherein the first and the second injector can be combined and be discharged by the same injector.

The second fuel can be hydrogen or, e.g., acetylene, ethylene, propane, or a mixture thereof. The first fuel can be gas such as natural gas, pure methane, or a gas with a methane component and/or other hydrocarbons.

Preferably, it can be provided the at least one further fuel injector is designed as a port injection valve.

Internal combustion engines operating with two different types of fuels, namely a gaseous fuel (e.g., natural gas) and a liquid fuel (e.g., diesel) are known as so called dual-fuel combustion engines. With the use of embodiments of the invention, internal combustion engines already operating with two different types of fuels can be operated with an additional type of fuel (e.g., hydrogen).

The internal combustion engine can be a stationary gas engine, which preferably is able to be coupled or is coupled to a generator for generating electrical power. Such an arrangement of a stationary gas engine and a generator is known as genset.

As mentioned before, it can be provided that the air-fuel-mixture supplied to the main combustion chamber is enriched during the intake stroke by a fuel—preferably hydrogen—which is supplied to the

- intake port and/or the intake manifold—preferably
  - between a supply line of the of the pre-chamber and the intake port and/or the intake manifold—or
- directly to the main combustion chamber.

It can be provided that the same air-fuel-mixture is used for the air-fuel-mixture supplied to the pre-chamber and air-fuel-mixture provided for the main combustion chamber before enrichment.

It can be provided that a supply line of the pre-chamber branches from an intake manifold and/or intake port of the main combustion chamber, wherein a fuel injector is provided in the intake port and/or the intake manifold for enrichment of the air or air-fuel-mixture supplied to the main combustion chamber, wherein the supply of the pre-chamber via the supply line is stopped when a volume of air or air fuel mixture enriched by the at least one fuel injector passes the branch of the supply line of the pre-chamber and the intake port and/or the intake manifold.

It can be provided that enrichment of the air-fuel-mixture supplied to the main combustion chamber is timed in such a way, that the enrichment is stopped when the intake valve of the main combustion chamber is closed, wherein preferably after closing of the intake valve air or an air-fuel-mixture is supplied to the pre-chamber via the intake port and/or intake manifold.

It can be provided that the air-fuel-mixture is supplied to the main combustion chamber by at least one intake valve, which is closed during the intake stroke before a piston in a cylinder reaches a bottom dead center position. Such a method is also named early Miller cycle. This method leads to a cooling of the charge of the cylinder (and therefore to reduced combustion temperatures and reduced compression work during compression stroke), because the charge of the cylinder expands if the valves are closed before the cylinder reaches a bottom dead center position.

It can be provided that the air-fuel-mixture supplied to the main combustion chamber is enriched during the whole intake stroke—preferably during the time of an opening of the at least one intake valve.

BRIEF DESCRIPTION OF THE DRAWINGS

Further details and advantages of the invention are apparent from the accompanying figures and the following description of the drawings. The figures show:

FIG. 8 is a schematic representation of an embodiment according to the invention, comprising fuel injectors for every cylinder, wherein the pre-chamber supply line for every pre-chamber is preferably branched off the intake manifold (optionally branched off the intake ports), further comprising a fuel injector (single port injection valve) in the intake manifold upstream the branch of the pre-chamber supply line

DETAILED DESCRIPTION

Figure 1:
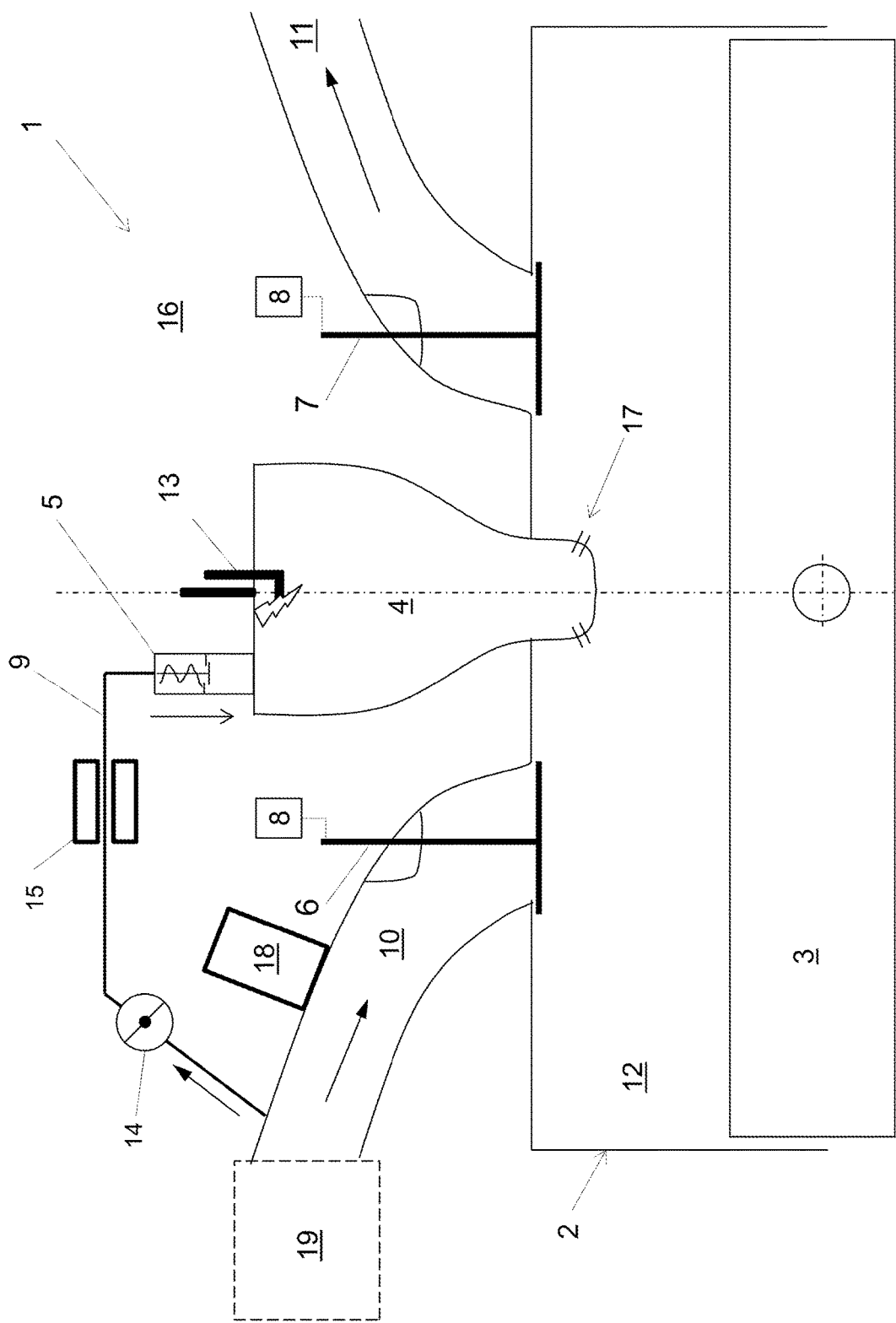
FIG. 1 is a schematic representation of the parts of an internal combustion engine in one embodiment of the invention, wherein the pre-chamber supply line is branched off the intake port and directly connects the intake port with the respective pre-chamber, wherein a port injection valve is arranged downstream the branch of the pre-chamber supply line.

In the context of the invention it can be provided, that for all embodiments, the supply line 9 to the pre-chamber 4 can be either branched off the intake manifold 19 and/or the intake port 10. In the case of branching off from the intake port 10, the pre-chamber 4 can be directly fluidically connected to the respective intake port 10. It should be mentioned, that although not every drawing indicates the possibility regarding how the pre-chamber 4 can be supplied, any combination of the embodiments depicted in the drawings is conceivable.

FIG. 1 schematically shows a cylinder 2 of an internal combustion engine 1 in which a piston 3 is arranged so as to be movable along an axis of the cylinder 2, whereby a main combustion chamber 12 is formed between the piston 3, the cylinder head 16, and the cylinder 2. At its top dead center position, the piston 3 with the cylinder 2 forms the so-called compression volume.

The cylinder 2 may be designed as part of a cylinder liner and/or a crank case. For the purpose of embodiments of the present invention, such components are collectively referred to as cylinder 2.

The intake port 10 can interface with the main combustion chamber 12 through an intake valve 6.

The exhaust manifold 11 can interface with the main combustion chamber 12 through an exhaust valve 7.

The intake valve 6 and the exhaust valve 7 can be actuated by the actuators 8. Example actuators for the intake valve 6 and exhaust valve 7 are a camshaft or hydraulic devices.

It can be provided that at least one gas mixer 22 is arranged upstream of the intake port 10, wherein by use of the gas mixer 22 a fuel-air-mixture (e.g., a mixture of air and natural gas) can be provided for the intake port 10. Furthermore, at least one compressor can be arranged upstream of the intake port 10, wherein the provided air or air-fuel mixture for the intake port 10 can be charged.

A pre-chamber 4 communicates with the main combustion chamber 12 via transfer passages 17 and has an ignition source 13 and a pre-chamber gas valve 5 in the form of a check valve, which is connected to a source for an air-gas mixture (as the air-fuel-mixture for the main combustion chamber 12 an the pre-chamber 4). In this embodiment, the source for an air-gas mixture is provided by a gas mixer 22 (indicated by the dotted square). Additionally or alternatively, a further injector 20 could be provided for introducing a gaseous fuel to the intake port 10.

The ignition source 13 is in this embodiment a spark plug.

In this exemplary embodiment, the intake port 10 itself serves as the source for the air-gas-mixture.

The supply line 9, which is formed as a cavity in the cylinder head 16 realizes the source for the air-fuel-mixture for the pre-chamber 4.

To regulate the quantity of air-gas-mixture that can be fed into the pre-chamber 4, a throttle valve 14 is arranged in the supply line 9 in this exemplary embodiment.

Furthermore, a tempering device 15 is provided in the form of pre-heating by means of engine coolant, such as water, in order to keep the supply line 9 at a temperature that prevents condensation of the gas-air mixture.

In the intake port 10, a fuel injector 18 is arranged—in this embodiment provided as a hydrogen injector—wherein the fuel injector 18 is configured to enrich the fuel, air, or air-fuel-mixture supplied to the main combustion chamber 12 with molecular hydrogen.

During the intake stroke, the pre-chamber 4 is supplied with the same—but not enriched—air or air-fuel-mixture as it is directed to the main combustion chamber 12 before hydrogen enrichment through the fuel injector 18.

During the compression stroke, the enriched air or air-fuel-mixture of the main combustion chamber 12 is pressed into the pre-chamber 4 through the transfer passages 17, wherein the enriched air-fuel-mixture of the main combustion chamber 12 is mixed with the fuel, air, or air-fuel-mixture of the pre-chamber 4, wherein the same air-fuel-mixture is used for the air-fuel-mixture supplied to the pre-chamber 4 and air-fuel-mixture provided for the main combustion chamber 12 before enrichment.

Figure 2:
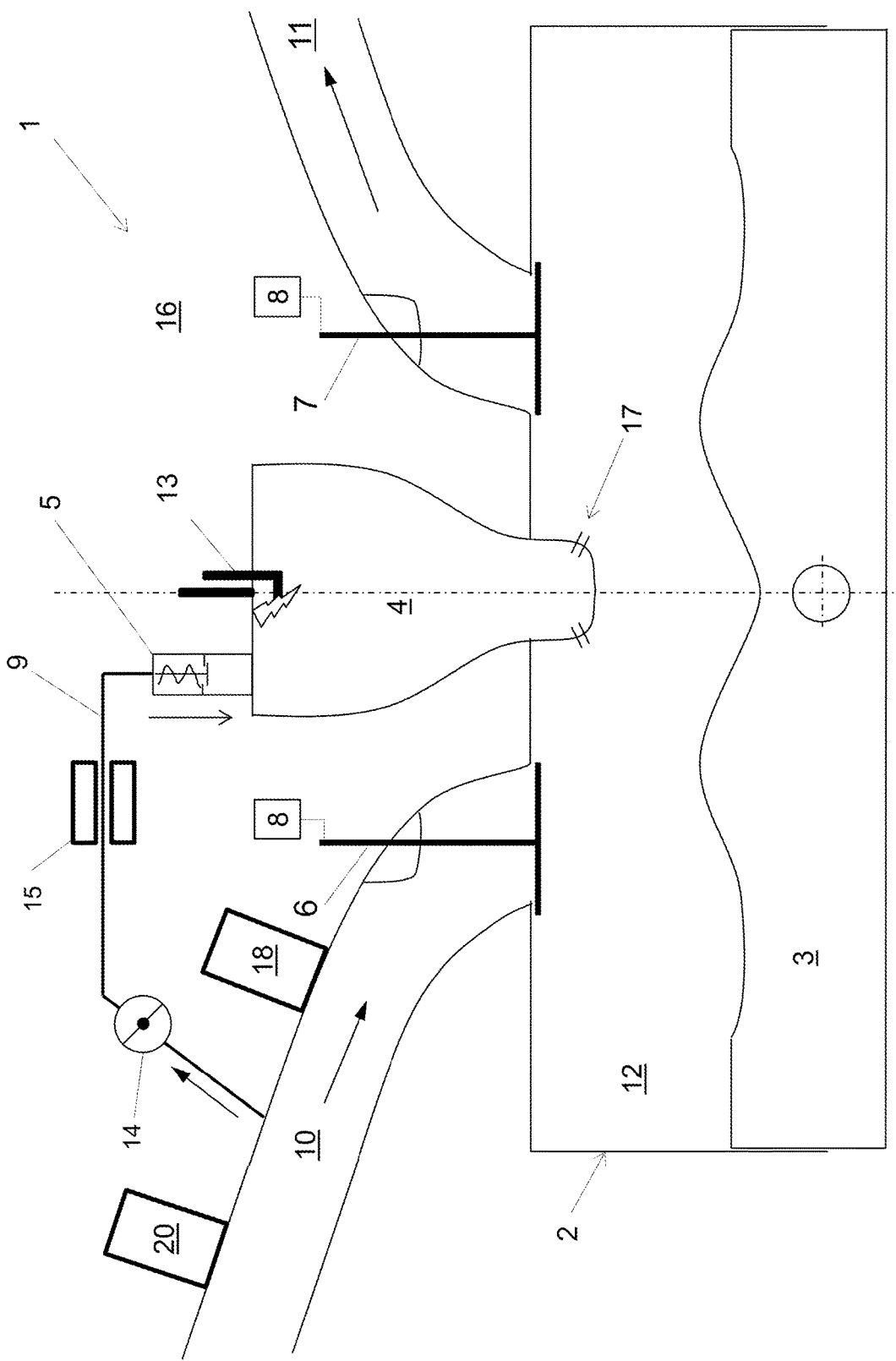
FIG. 2 is a schematic representation of the parts of an internal combustion engine in another embodiment of the invention, wherein the pre-chamber supply line is branched off the intake port and directly connects the intake port with the respective pre-chamber, wherein a port injection valve is arranged downstream the branch of the pre-chamber supply line and a further port injection valve is arranged upstream the branch of the pre-chamber supply line

FIG. 2 shows a further schematic representation of the parts of an internal combustion engine 1, wherein the piston 3 comprises a particularly curved piston crown (top surface of the piston).

Furthermore, compared to FIG. 1, in FIG. 2 a further fuel injector 20 is arranged upstream of the supply line 9. This further fuel injector 20 is designed as a port injection valve introducing a gaseous fuel to the intake port 11.

The remaining characteristics are analogous to FIG. 1 (which shows a piston 4 configured as flat piston).

Figure 3:
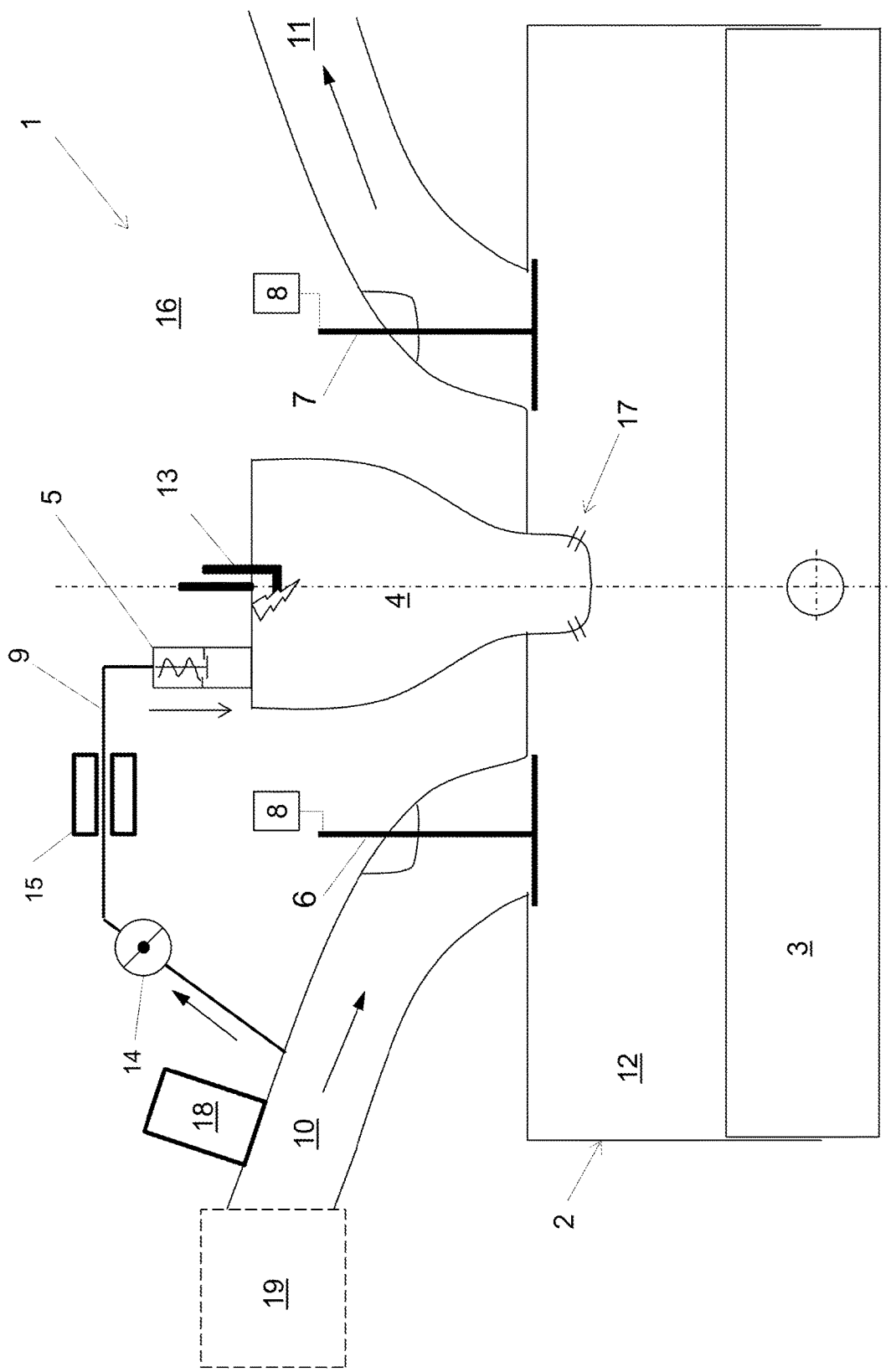
FIG. 3 is a schematic representation of the parts of an internal combustion engine having a flat piston in another embodiment of the invention, wherein the pre-chamber supply line is branched off the intake port and directly connects the intake port with the respective pre-chamber, wherein an port injection valve is arranged upstream the branch of the pre-chamber supply line.

FIG. 3 shows a further schematic representation of the parts of an internal combustion engine 1. In the embodiment shown by FIG. 3, the fuel injector 18 is arranged in the intake port 10 in flow direction upstream of the branch of the intake port 10 and the transfer passage 17.

The intake port 10 is connected to an intake manifold 19, wherein the intake manifold 19 provides an air-fuel-mixture (e.g., a mixture of air and natural gas) for the intake port 10.

Intake manifolds 19 are used to provide air or an air-fuel-mixture for more than one main combustion chamber 12 (see also FIGS. 4 to 9). In most cases, the intake manifold 19 fluidically connects the intake ports 10 with an air or air-fuel-mixture source, e.g., a gas mixer 22.

The fuel injector 18 is, in this embodiment, provided as a hydrogen injector, wherein the fuel injector 18 is configured to enrich the air-fuel-mixture—provided by the intake manifold 19—supplied to the main combustion chamber 12 with hydrogen.

During the intake stroke, the pre-chamber 4 is supplied with the air-fuel-mixture provided by the intake manifold 19 via the intake port 10 and the transfer passage 17. During this procedure, the main combustion chamber 12 is also supplied with the (same) air-fuel-mixture provided by the gas mixer 22 via the intake port 10.

During the intake stroke, the supply of the pre-chamber 4 is stopped by closing the throttle valve 14. This could also be done by closing the pre-chamber gas valve 5 (or e.g., an alternative valve which could be arranged in the transfer passage 17).

This stopping of a supply of the pre-chamber has to be timed in such a way that the pre-chamber 4 is only scavenged or supplied by an air-fuel mixture of the intake manifold 19.

After stopping the supply of the pre-chamber 4, the air-fuel mixture of the intake manifold 19 can be enriched by the fuel injector 18, wherein the enriched air-fuel-mixture is supplied to the main combustion chamber via the intake port 10.

It is not necessary to have this strict timing for stopping the supply of the pre-chamber 4 and starting the enrichment afterwards. It can also be provided that the enrichment is started during the supply of the pre-chamber 4, wherein the supply of the pre-chamber 4 is stopped in the moment when the enriched air-fuel-mixture reaches the throttle-valve 14 or the pre-chamber gas valve 5 or shortly before. Therefore, it is possible (for a short time) that the enrichment and the supply of the pre-chamber 4 happen in parallel.

Furthermore, it would also be possible to enrich the air-fuel-mixture provided by the intake manifold 19 the whole time, wherein also the enriched air-fuel-mixture would be supplied to the pre-chamber 4, wherein only a lightly enriched air-fuel-mixture could be supplied to the pre-chamber 4 and a more strongly enriched air-fuel-mixture is supplied to the main combustion chamber 12.

This could be done—for example—by controlling the fuel injector 18 in such a way, that after providing the air-fuel-mixture of the pre-chamber 4 the injection volume supplied by the fuel injector 18 is increased (to provide an enriched air fuel mixture for the main combustion chamber 12, having a lower ignition delay than the fuel of the air-fuel-mixture provided to the pre-chamber 4).

Figure 4:
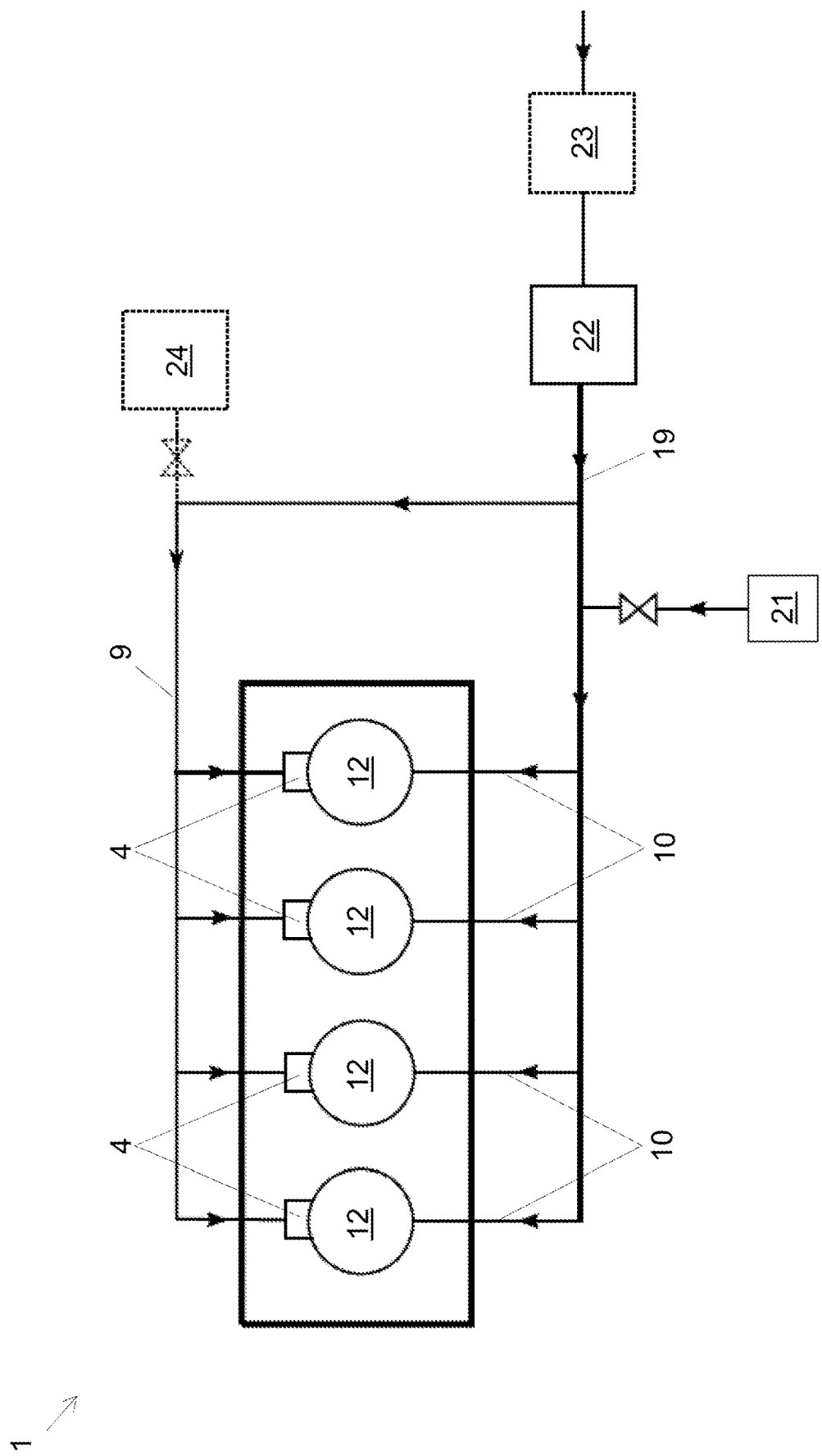
FIG. 4 is a schematic representation of an embodiment according to the invention, comprising a fuel injector in the intake manifold (single port injection valve), wherein the supply line for the pre-chamber is branched off upstream the single port injection valve.

FIG. 4 shows an embodiment according to embodiments of the invention, wherein a schematic representation of an internal combustion engine 1 comprising four main combustion chambers 12 is illustrated. The main combustion chambers 12 are provided with an air-fuel-mixture of a gas mixer 22 via an intake manifold 19 and intake ports 10.

Additionally, a compressor 23 (illustrated by the dotted lines) can be arranged at the intake manifold 19 for providing charged boost pressure in the intake manifold 19 to increase the combustion efficiency. A compressor 23 can be part of a turbo charger or can be mechanically driven (e.g., by connecting the compressor 23 to the crankshaft of the internal combustion engine 1). The compressor 23 could also be arranged downstream of the gas mixer 22 and/or can be provided with more than one compressor stage.

The supply line 9 for supplying the pre-chambers 4 with an air-fuel-mixture branches in this embodiment from the intake manifold 19 downstream of the gas mixer 22 and upstream of a single fuel injector 21.

This single fuel injector 21—in this embodiment provided as a hydrogen injector—is configured to enrich the air-fuel-mixture provided by the gas mixer 22 which is supplied to the main combustion chambers 12. Using a single fuel injector 21 in the intake manifold 19, high pressure injections can be performed to enrich the air-fuel-mixture supplied to the main combustion chambers 12.

Furthermore, in the supply line 9 of the pre-chambers 4, an optional additional fuel or air supply 24 can be provided. If desired, the additional fuel and/or air supply 24 can be used to modify the air-fuel-mixture supplied and/or ignited in the pre-chambers 4.

Figure 5:
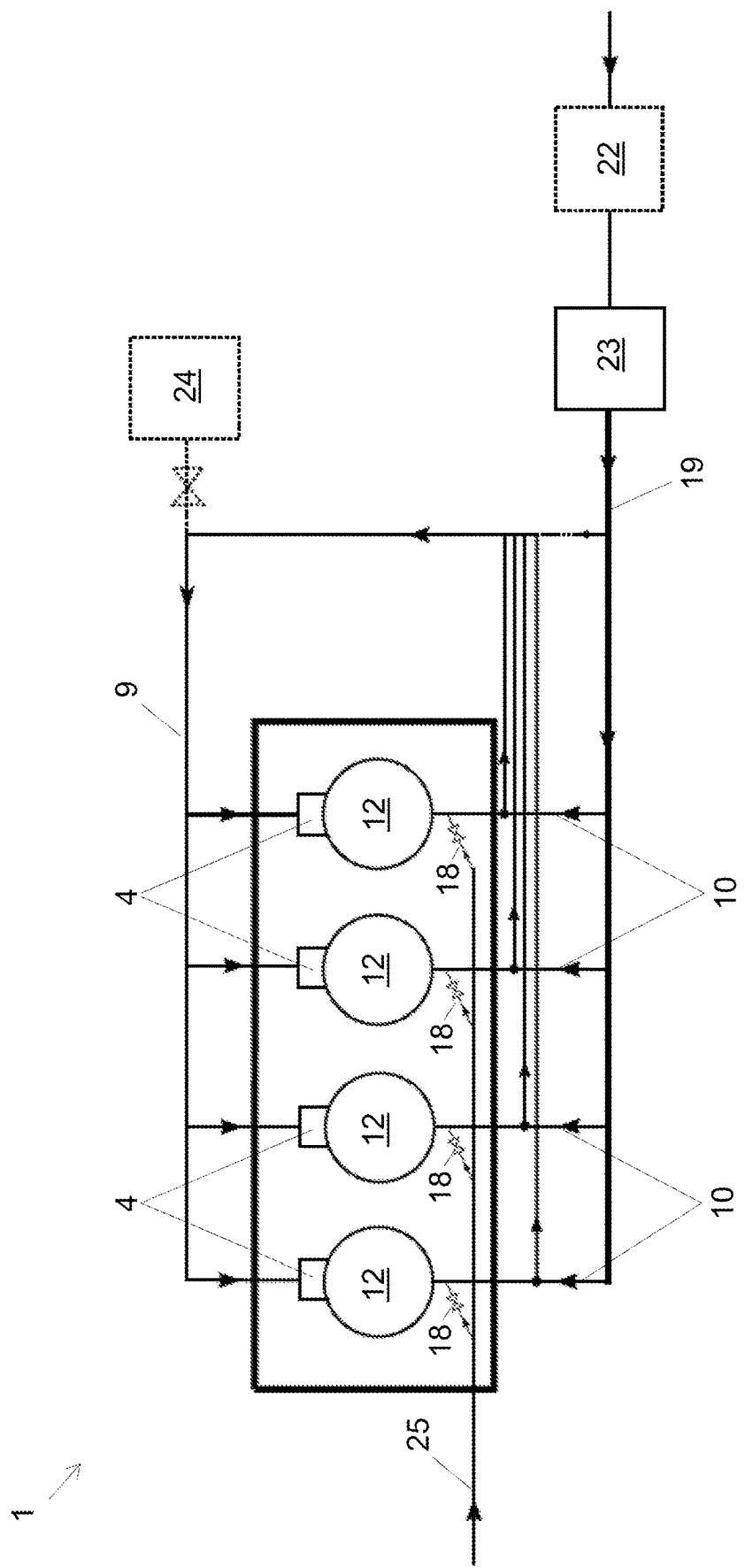
FIG. 5 is a schematic representation of an embodiment according to the invention, comprising fuel injectors for every cylinder, wherein the pre-chamber supply lines of for a specific pre-chamber are preferably branched off the intake ports of the respective cylinders (optionally branched off the intake manifold)

FIG. 5 shows another embodiment according to the invention, wherein (compared to FIG. 4) an additional fuel supply 25 for the main combustion chamber 12 is provided. Using this additional fuel supply 25 for the main combustion chambers 12, an additional fuel (e.g., hydrogen) can be supplied to the intake ports 10 to enrich the air-fuel-mixture (and therefore decrease the ignition delay) supplied to the main combustion chambers 12. As the fuel injectors 18 are provided close to the main combustion chambers 12, a fast response regarding a change of the air-fuel-mixture of the main combustion chambers 12 can be achieved by varying the supply of the fuel injectors 18.

Figure 6:
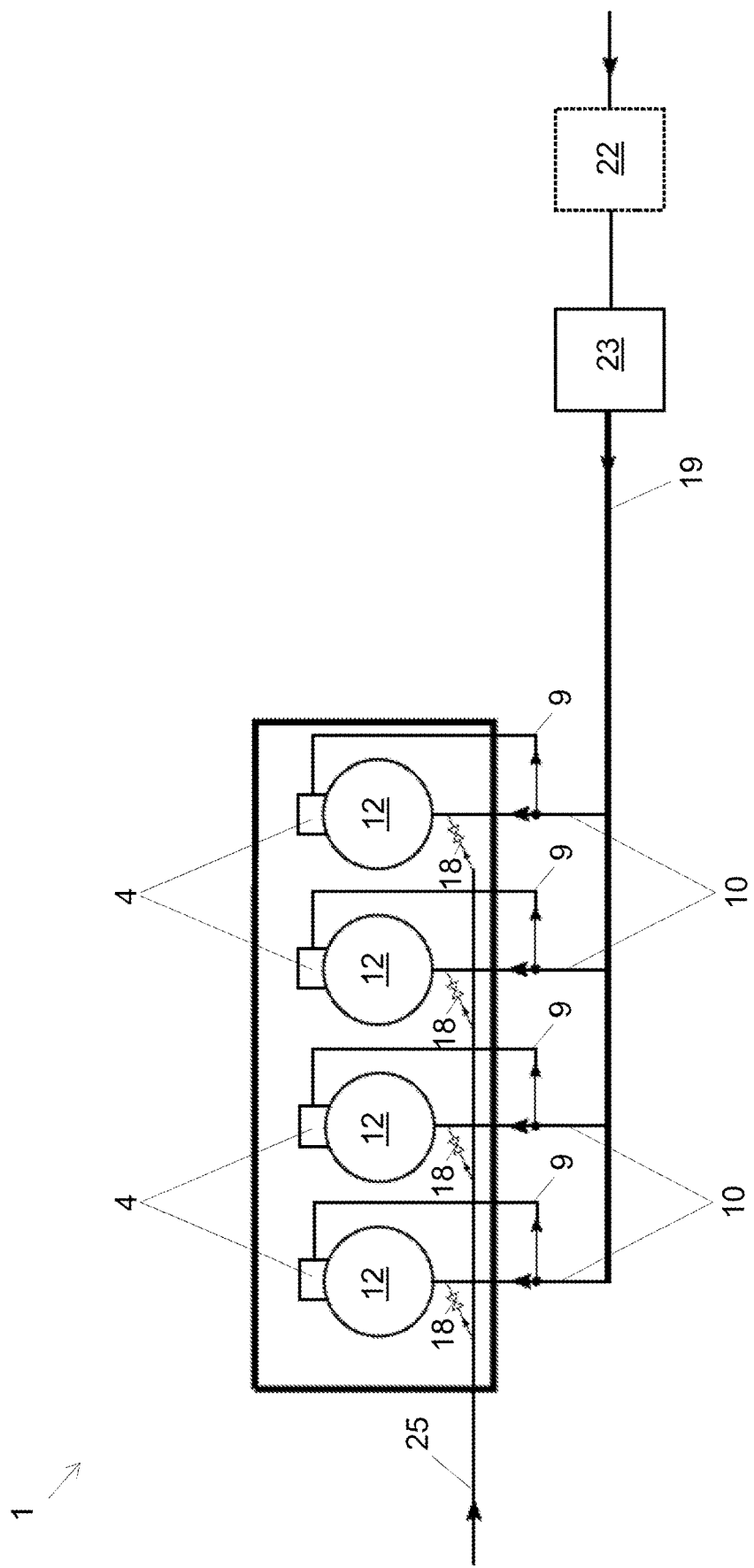
FIG. 6 is a schematic representation of an embodiment according to the invention, comprising fuel injectors for every cylinder, wherein the pre-chamber supply lines of for a specific pre-chamber are branched off the intake ports of the respective cylinders, directly connecting the intake port with the respective pre-chamber.

Furthermore, in this embodiment, it is illustrated that the supply line 9 can also branch from the intake ports 10 upstream of the additional fuel supply 25. Of course, the supply lines 9 can be provided for each pre-chamber 4 separately (as indicated in FIG. 6). Optionally, the supply lines 9 for the pre-chambers can be branched off the intake manifold 19, either in the form of a single rail or preferred that each pre-chamber 4 is fluidically connected to the intake manifold 19 via a separate supply line 9.

In FIG. 5, the compressor 23 is arranged downstream of an additional or optional gas mixer 22 (illustrated by the dotted lines).

FIG. 6 shows a further embodiment according to the invention, wherein (compared to FIG. 5) the supply line 9 branches from the intake ports 9. This embodiment generally corresponds with FIG. 1.

Figure 7:
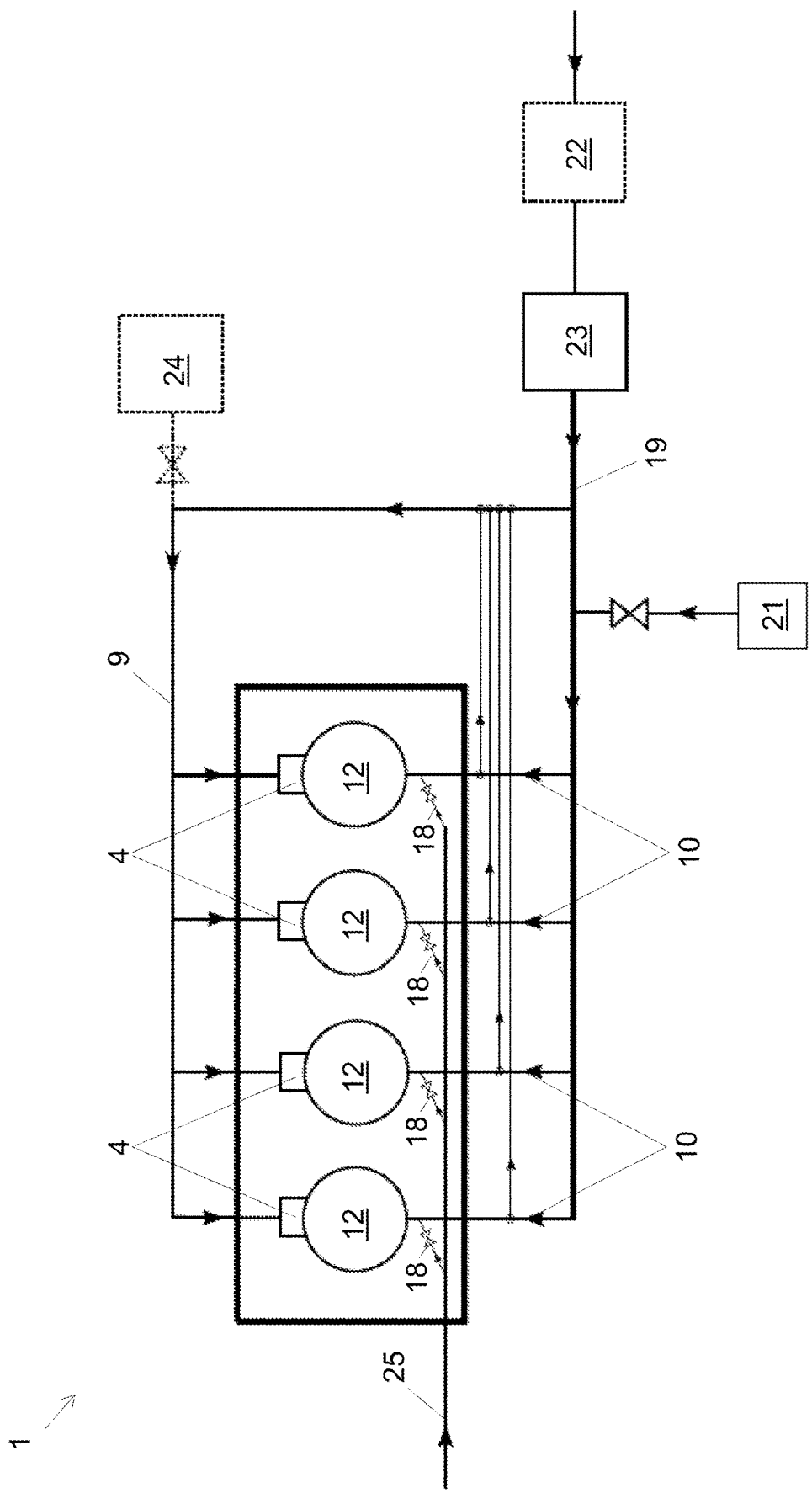
FIG. 7 is a schematic representation of an embodiment according to the invention, comprising fuel injectors for every cylinder, wherein the pre-chamber supply line for every pre-chamber is preferably branched off the intake manifold (optionally branched off the intake ports), further comprising a fuel injector (single port injection valve) in the intake manifold downstream the branch of the pre-chamber supply line.

FIG. 7 shows a schematic representation of an embodiment according to the invention, comprising fuel injectors 18 for every cylinder 2, wherein the pre-chamber 4 supply line 9 for every pre-chamber 4 is branched off of the intake manifold 19 (optionally branched off the intake ports 10), further comprising a fuel injector 21 (single port injection valve) in the intake manifold 10 downstream the branch of the pre-chamber supply line 9.

The air or air-fuel-mixture (depending if the additional dotted illustrated gas mixer 22 is present and/or active) provided by the compressor 23 can be supplied from the intake manifold 19 by the supply line 9 to the pre-chambers 4.

Downstream of the supply line 9, a single fuel injector 21 is arranged in the intake manifold 19 for enrichment of the air-fuel-mixture or the air provided by the compressor 23. This enriched air-fuel-mixture can further be enriched in the cylinder 2 individually by activating the fuel injectors 18 in the intake ports 10, which intake ports 10 branch downstream of the single fuel injector 21.

The supply line 9 can additionally branch from the intake ports 10 or the intake manifold 19.

The remaining components and additional components correspond to the already mentioned ones of the previous Figures.

The embodiment shown by FIG. 8 mainly correspond to FIG. 7 excluding the arrangement of the single fuel injector 21, which is arranged in the embodiment of FIG. 8 upstream of the branch of the supply line 9 in the intake manifold 19.

Also, with such an arrangement of the single fuel injector 21, an air or an air-fuel-mixture (depending if the additional dotted illustrated gas mixer 22 is present) can be enriched, and the same enriched air-fuel-mixture can be supplied to the pre-chambers 4 and the main combustion chambers 12, wherein the enriched air-fuel-mixture
- is further enriched in the intake ports 10 by the fuel injectors 18 before it is supplied to the main combustion chambers 12 and/or
- is mixed with a further fuel or air by the supply 24 before it is supplied to the pre-chambers 4.

USED REFERENCE SIGNS 1 internal combustion engine
2 cylinder
3 piston
4 pre-chamber
5 pre-chamber gas valve
6 intake valve
7 exhaust valve
8 actuators
9 supply line
10 intake port
11 exhaust manifold
12 combustion chamber
13 ignition source
14 throttle valve
15 tempering device
16 cylinder head
17 transfer passages
18 fuel injector
19 intake manifold
20 further fuel injector (intake port)
21 single fuel injector (intake manifold)
22 gas mixer
23 compressor
24 additional fuel or air supply for the pre-chamber
25 additional fuel supply for the main combustion chamber

The invention claimed is:

1. A system, comprising:
an internal combustion engine, comprising:
a main combustion chamber comprising at least one intake valve and at least one exhaust valve, wherein at least one intake port fluidically connected to an intake manifold is configured to supply an air and/or an air-fuel-mixture to the main combustion chamber via the at least one intake valve;

a pre-chamber in fluid connection with the main combustion chamber, wherein the pre-chamber is in fluid connection with the intake port and/or the intake manifold through a supply line, and the pre-chamber is configured to support an ignition source; and at least one fuel injector is arranged in the intake port and/or in the intake manifold and/or in the main combustion chamber, wherein the at least one fuel injector is configured to enrich the air and/or air-fuel-mixture supplied to the main combustion chamber to have a lower ignition delay than an air-fuel-mixture supplied to the pre-chamber, and/or air or air-fuel-mixture can be supplied to the pre-chamber to have a higher ignition delay than an air-fuel-mixture supplied to the main combustion chamber.

2. The system as set forth in claim 1, wherein the at least one fuel injector is arranged in a flow direction downstream of a branch of the supply line of the pre-chamber and the intake port and/or the intake manifold.

3. The system as set forth in claim 1, comprising at least one throttle valve disposed in the supply line of the pre-chamber.

4. The system as set forth in claim 3, wherein the at least one fuel injector is arranged in a flow direction upstream of a branch of the supply line of the pre-chamber and the intake port and/or the intake manifold, further comprising a control configured to control the throttle valve, wherein the control is configured to close the throttle valve when a volume of air or air-fuel mixture enriched by the at least one fuel injector passes the branch of the supply line of the pre-chamber and the intake port and/or the intake manifold.

5. The system as set forth in claim 1, wherein the at least one fuel injector is configured as a hydrogen injector configured to enrich the air and/or air-fuel-mixture supplied to the main combustion chamber with hydrogen.

6. The system as set forth in claim 1, comprising a gas mixer and/or at least on further fuel injector configured to provide the air-fuel-mixture for the main combustion chamber, wherein a first fuel supplied by the at least one further injector and/or the gas mixer is different from a second fuel supplied by the at least one fuel injector.

7. The system as set forth in claim 1, wherein the internal combustion engine comprises a stationary gas engine coupled to a generator.

8. A method, comprising:
supplying an air or air-fuel-mixture to a main combustion chamber of an internal combustion engine; and
supplying an air-fuel mixture to a pre-chamber of the internal combustion engine, wherein the air or air-fuel-mixture supplied to the main combustion chamber has a lower ignition delay than the air-fuel-mixture supplied to the pre-chamber, and the pre-chamber is configured to support an ignition source.

9. The method as set forth in claim 8, comprising supplying a fuel enrichment to the air or air-fuel-mixture supplied to the main combustion chamber before it is supplied to the main combustion chamber, wherein the fuel enrichment comprises a second fuel having a lower ignition delay than a first fuel of the air-fuel-mixture supplied to the pre-chamber.

10. The method as set forth in claim 9, wherein the air or air-fuel-mixture supplied to the main combustion chamber is enriched during an intake stroke by the second fuel supplied to
an intake port and/or an intake manifold between a supply line of the pre-chamber and the intake port and/or the intake manifold; or
directly to the main combustion chamber.

11. The method as set forth in claim 9, wherein the same air-fuel-mixture is used for the air-fuel-mixture supplied to the pre-chamber and the air-fuel-mixture supplied to the main combustion chamber before the fuel enrichment.

12. The method as set forth in claim 11, wherein a supply line of the pre-chamber comprises a branch from an intake port and/or an intake manifold of the main combustion chamber, wherein a fuel injector is configured to provide the fuel enrichment in the intake port and/or the intake manifold for enrichment of the air or air-fuel-mixture supplied to the main combustion chamber, wherein the supply of the pre-chamber via the supply line is stopped when a volume of air or air-fuel mixture enriched by the at least one fuel injector passes the branch of the supply line of the pre-chamber and the intake port and/or the intake manifold.

13. The method as set forth in claim 9, comprising timing the fuel enrichment of the air or air-fuel-mixture supplied to the main combustion chamber to stop when an intake valve of the main combustion chamber is closed, wherein after closing of the intake valve air or an air-fuel-mixture is supplied to the pre-chamber via an intake port and/or an intake manifold.

14. The method as set forth in claim 13, wherein the air-fuel-mixture is supplied to the main combustion chamber by the intake valve which is closed during an intake stroke before a piston in a cylinder reaches a bottom dead center position.

15. A method, comprising:
controlling a first fuel-air mixture in a combustion chamber relative to a second fuel-air mixture in a pre-chamber of an internal combustion engine, wherein the first fuel-air mixture has a higher ignitability and/or a lower ignition delay relative to the second fuel-air mixture, and the pre-chamber is configured to support an ignition source.

16. The system of claim 15, wherein controlling comprises enriching the first fuel-air mixture with a fuel enrichment.

17. The system of claim 16, wherein the fuel enrichment comprises a second fuel different from a first fuel of the first and/or second fuel-air mixtures.

18. The system of claim 17, wherein the first fuel is the same fuel in the first and second fuel-air mixtures.

19. The system of claim 16, wherein the fuel enrichment comprises hydrogen.

20. The system of claim 16, comprising supplying the fuel enrichment downstream from a fuel-air mixer and a branch supply line extending to the pre-chamber.

* * * * *